United States Patent [19]
Mourey et al.

[11] Patent Number: 5,452,456
[45] Date of Patent: Sep. 19, 1995

[54] APPARATUS FOR EXECUTING A PLURALITY OF PROGRAM SEGMENTS HAVING DIFFERENT OBJECT CODE TYPES IN A SINGLE PROGRAM OR PROCESSOR ENVIRONMENT

[75] Inventors: Jean-Charles D. Mourey, Cupertino; Sean R. Parent, Morgan Hill; Bruce K. Jones, Mountain View; Alan W. Lillich, Los Gatos; Erik L. Eidt, Campbell; Eric P. Traut, Mountain View, all of Calif.

[73] Assignee: Apple Computer, Inc., Cupertino, Calif.

[21] Appl. No.: 993,923

[22] Filed: Dec. 18, 1992

[51] Int. Cl.⁶ ............................................... G06F 9/44
[52] U.S. Cl. .............................. 395/700; 364/DIG. 1; 364/281.3
[58] Field of Search ................................. 395/650, 700

[56] References Cited

U.S. PATENT DOCUMENTS

| | | | |
|---|---|---|---|
| 4,084,235 | 4/1978 | Hirtle et al. | 364/DIG. 1 |
| 4,589,087 | 5/1986 | Auslander et al. | 364/768 |
| 4,766,566 | 8/1988 | Chuang | 364/DIG. 1 |
| 4,779,187 | 10/1988 | Letwin | 364/DIG. 1 |
| 4,812,975 | 3/1989 | Adachi et al. | 364/DIG. 1 |
| 4,825,358 | 4/1989 | Letwin | 364/DIG. 1 |
| 4,974,159 | 11/1990 | Hargrove et al. | |
| 5,027,273 | 6/1991 | Letwin | 364/DIG. 1 |

FOREIGN PATENT DOCUMENTS

| | | |
|---|---|---|
| 0387172A2 | 2/1990 | European Pat. Off. |
| 0414624A2 | 5/1990 | European Pat. Off. |

OTHER PUBLICATIONS

AIX XL FORTRAN Compiler/6000, User's Guide, Version 2.3, (Sep. 1992), pp. 179–193.
IBM J. Res. Develop., vol. 34, No. 1, (Jan. 1990), "IBM RISC SYSTEM/6000 processor architecture", by Oehler et al., pp. 23–36.
"IBM J. Res. Develop.", vol. 34, No. 1(Jan. 1990), Machine organization of the IBM RISC System/6000 processor, by Grohoski, pp. 37–58.
IBM J. Res. Develop., vol. 34, No. 1, (Jan. 1990), "Managing programs and libraries in AIX Version 3 for RISC System/6000 processors", by Auslander, pp. 98–104.
Communications of the ACM, vol. 36, No. 2, (Feb. 1993), "Binary Translation", by Sites et al., pp. 69–81.
CD-ROM, "Code Warrior", Developer CD Series, VO. IX, (Oct. 1991), The Apple IIe Card for the Macintosh LC, (May 1991), by Luther et al.
Press Release–"Apple Cuts Cost of Color by 60 Percent with New Macintosh LC", (Oct. 1990).
Press Release–"Apple Ships Apple IIe Card for the Macintosh LC Computer", (Apr. 1991).

*Primary Examiner*—Thomas M. Heckler
*Attorney, Agent, or Firm*—Helene P. Workman

[57] ABSTRACT

The invention provides a method and apparatus for switching between execution of a plurality of object code types having different conventions for invoking program procedures and performing stack manipulations. The invention may also be used to switch between different calling conventions within a single object code type. Briefly according to the invention, a computer system comprises a routine descriptor, a stack switch frame, a mode switching mechanism for switching from a first processor, code or calling convention type to a second processor, code or calling convention type and means for executing instructions in various code type codes. A routine descriptor describes a program or code segment and its code type and calling conventions. A routine descriptor contains, among other information, a "mixed mode" field which is set to a specific, predetermined value such as a value indicating an instruction which is not legal in the runtime environment of a first processor, code or calling convention type. When that instruction is encountered, control is transferred to the mode switching mechanism. A routine descriptor also contains a "procedure information" field which is set to a value indicating the convention for invoking a program segment and performing appropriate stack manipulations. When a routine calls a routine having a different stack model, the mode switching mechanism uses a stack switch frame to provide a transition between the two different stack types.

44 Claims, 8 Drawing Sheets

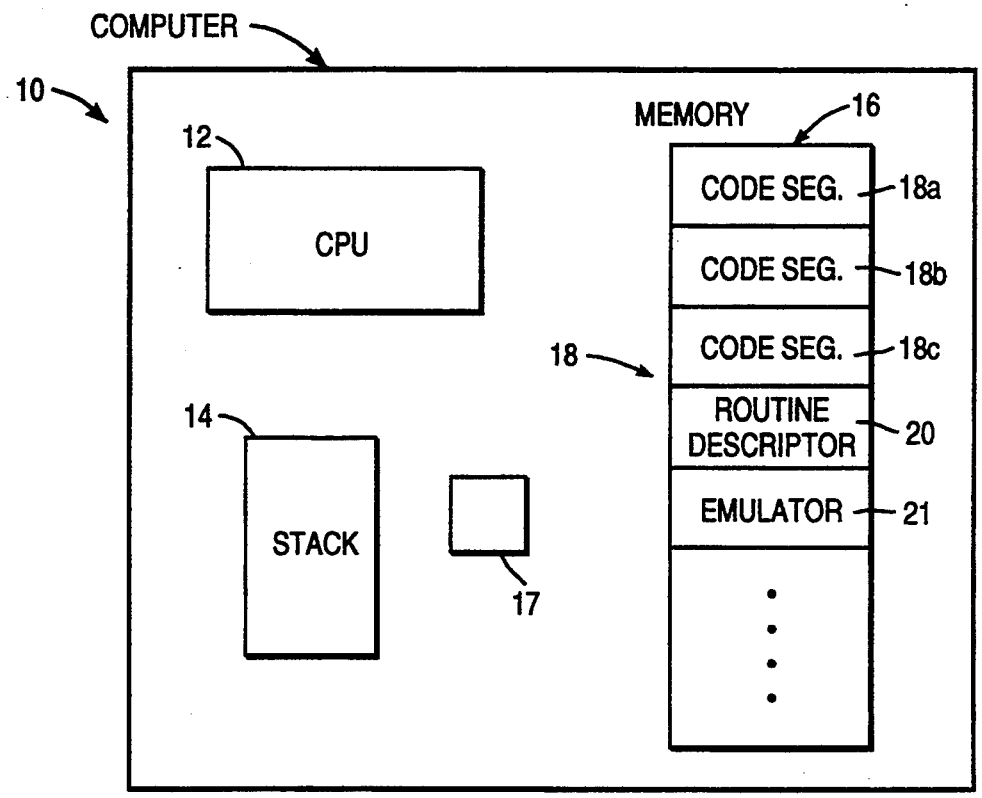
FIG_1
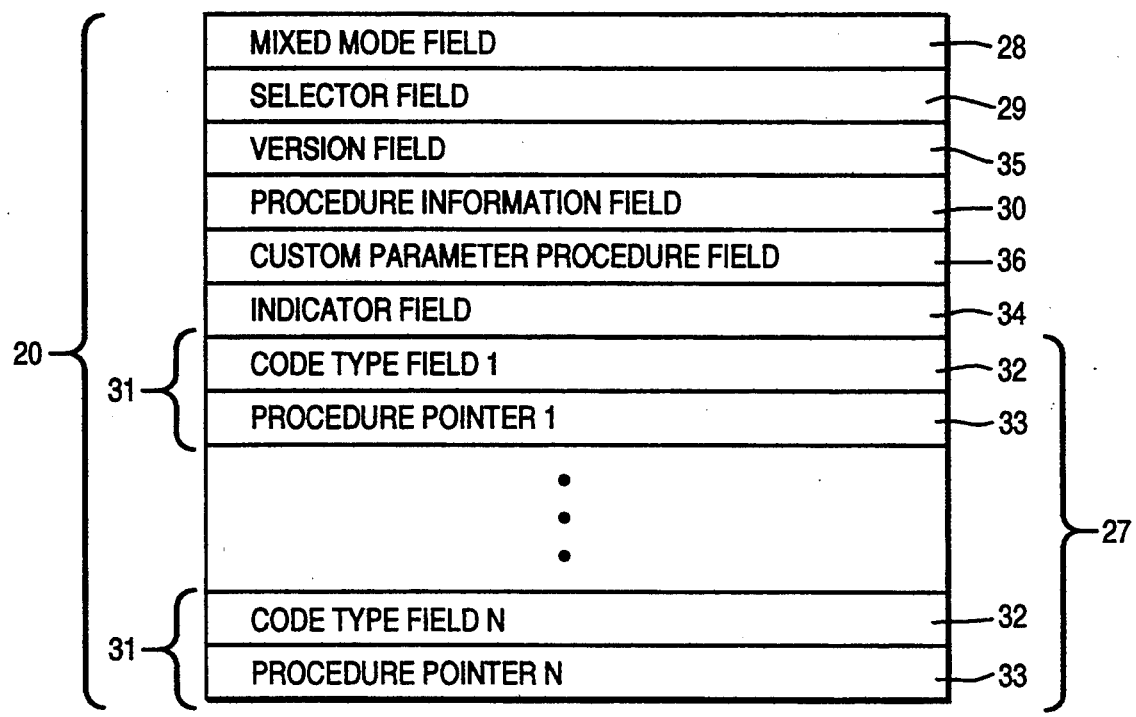
FIG_2

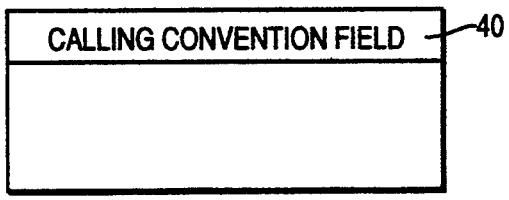
FIG_3A
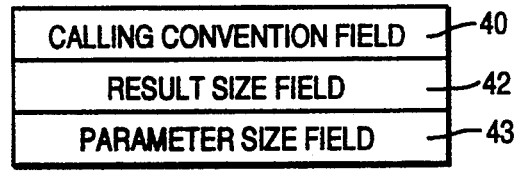
FIG_3B
FIG_3C
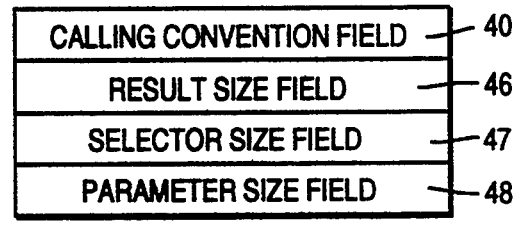
FIG_3D
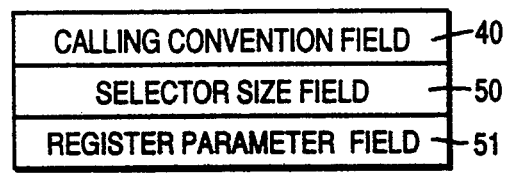
FIG_3E
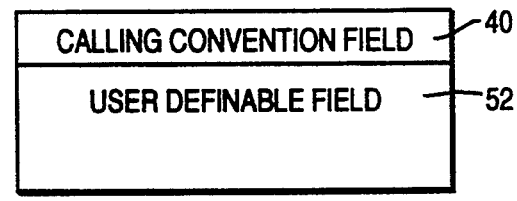
FIG_3F
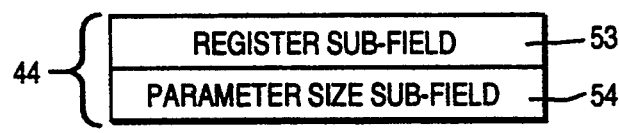
FIG_4

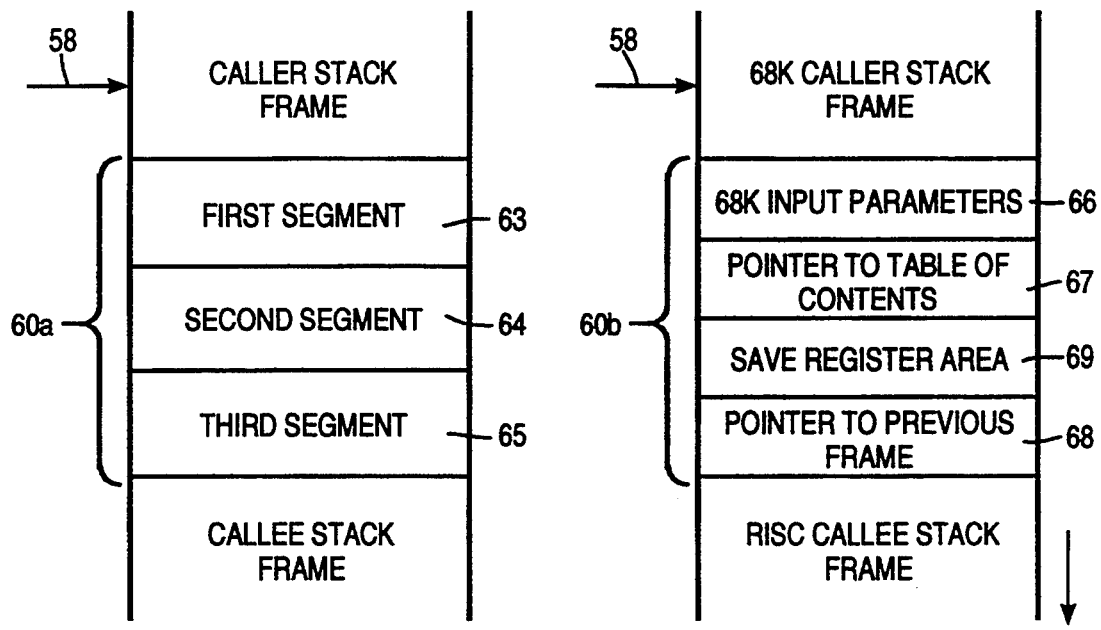
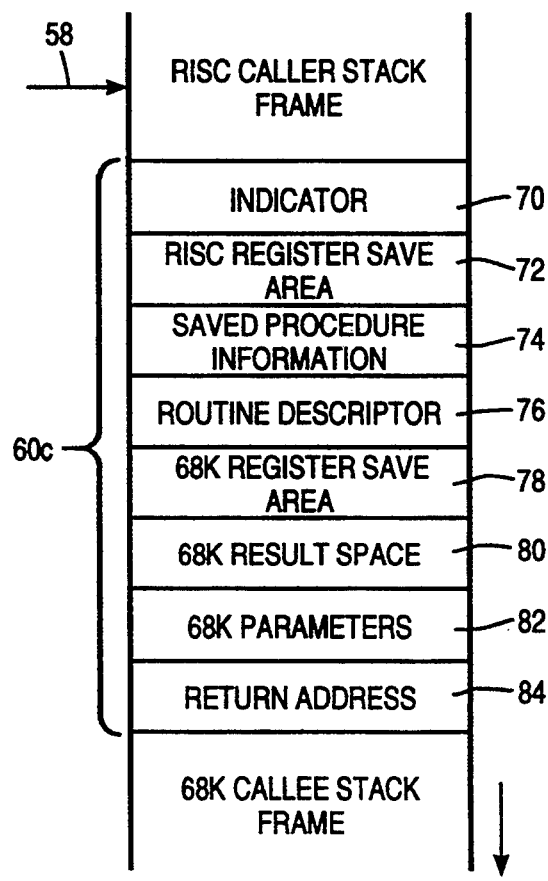

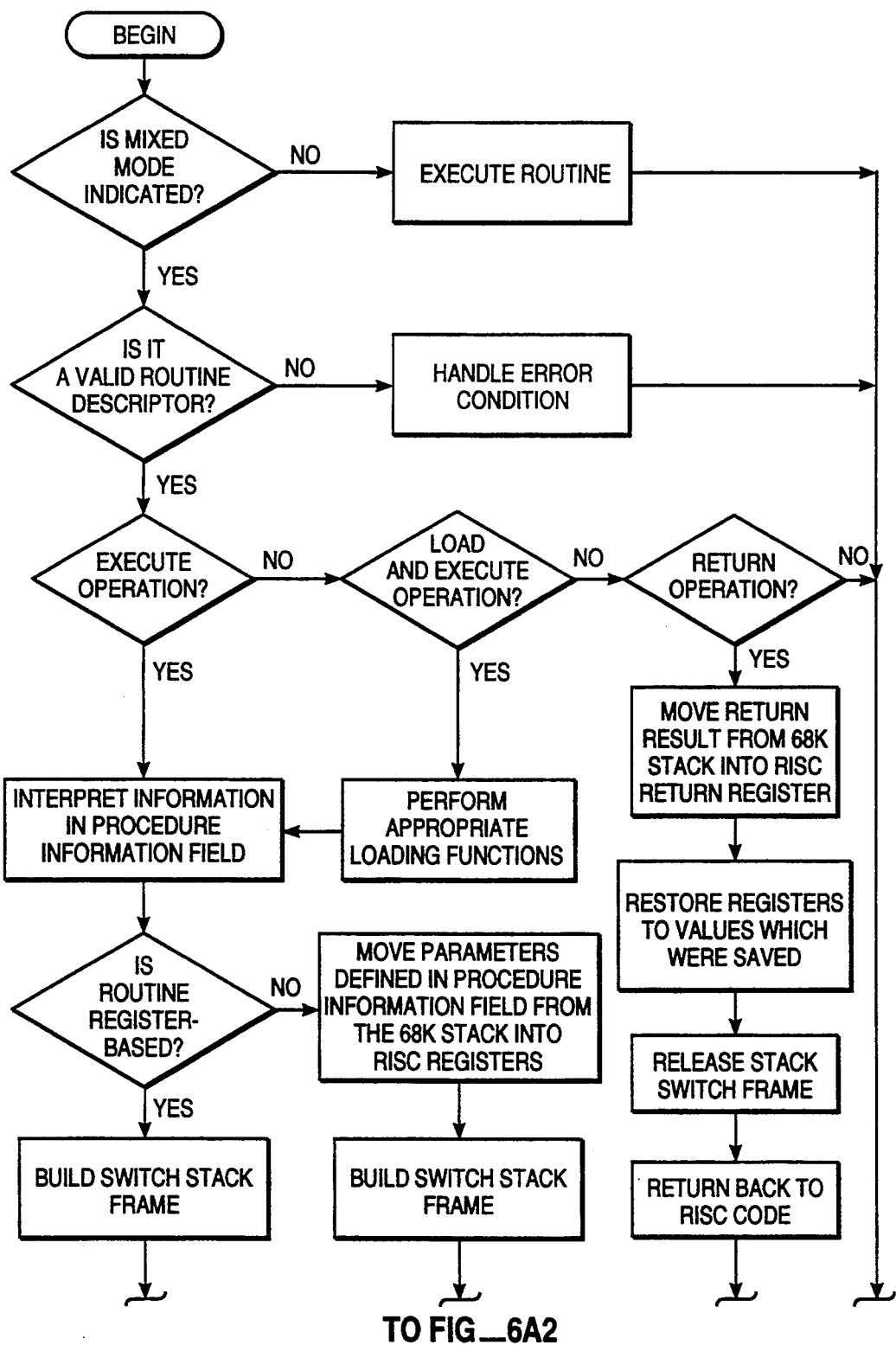
FIG_6A1

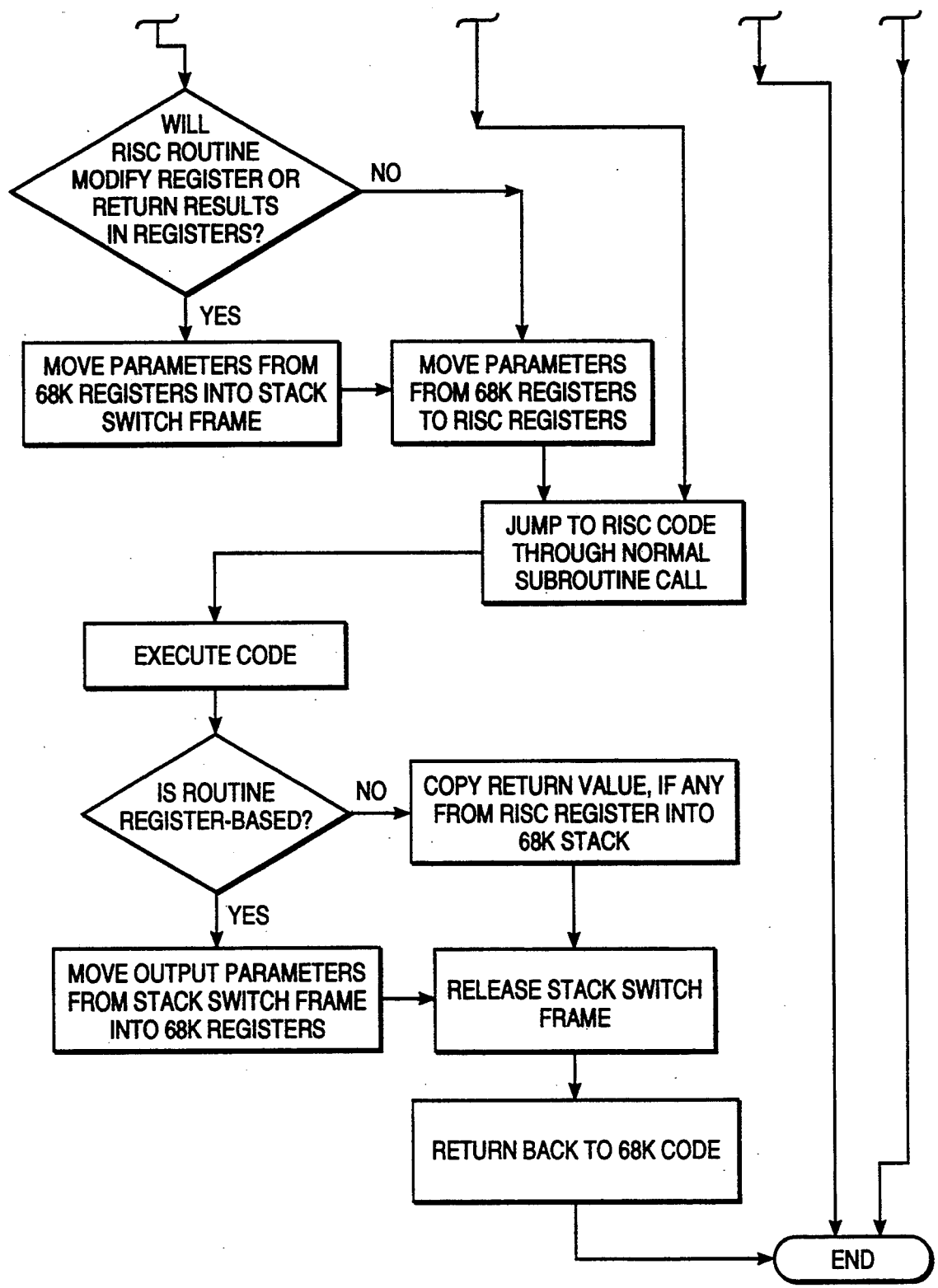

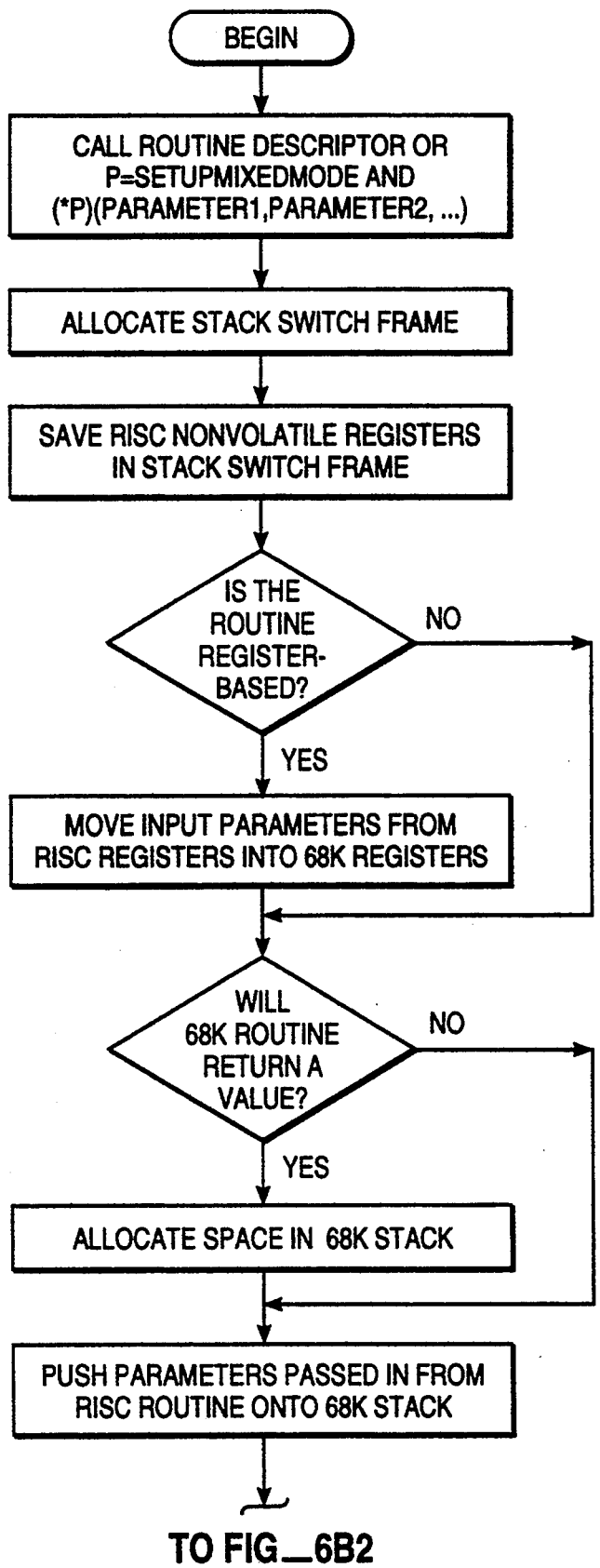
FIG_6B1

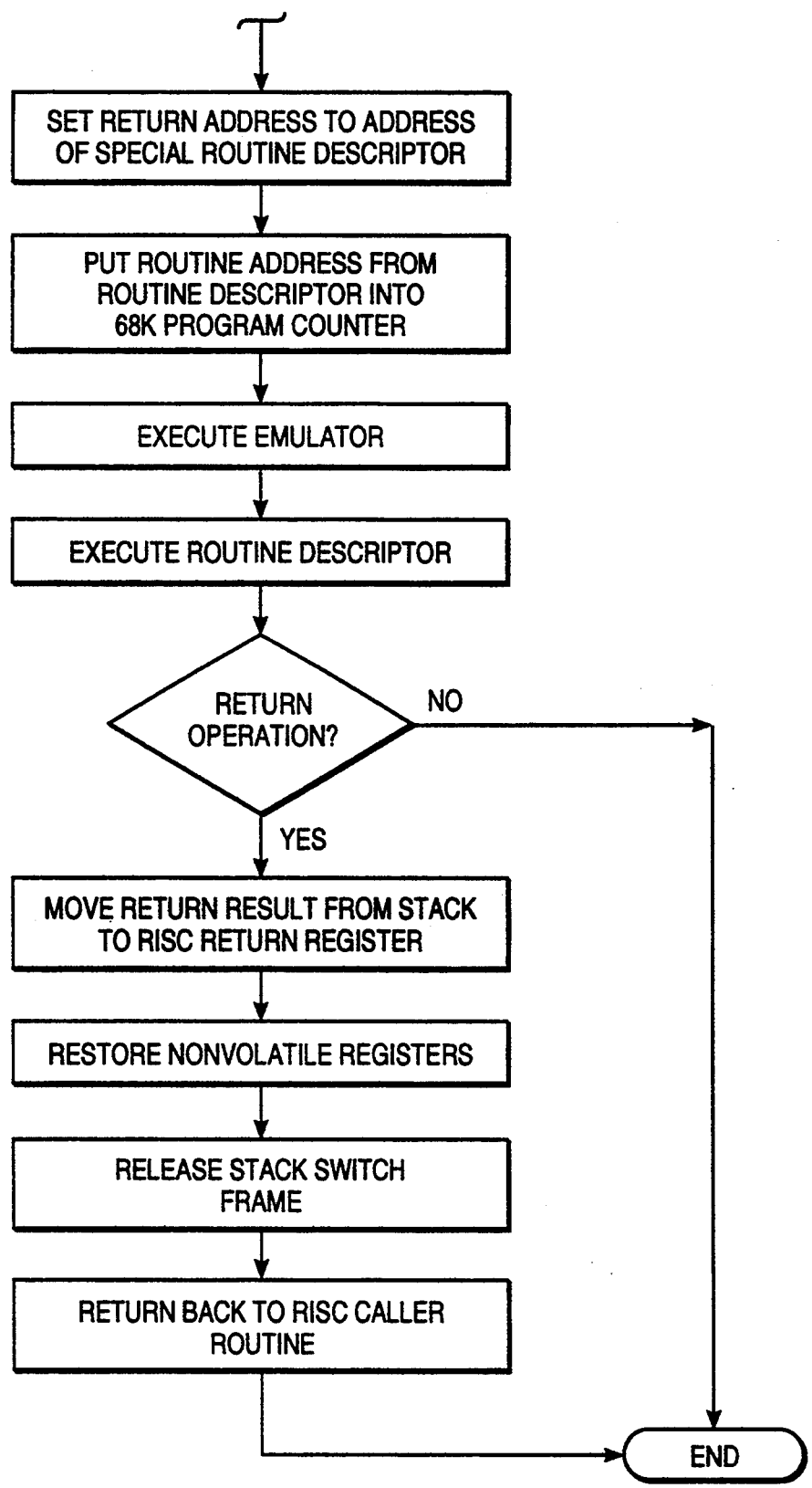

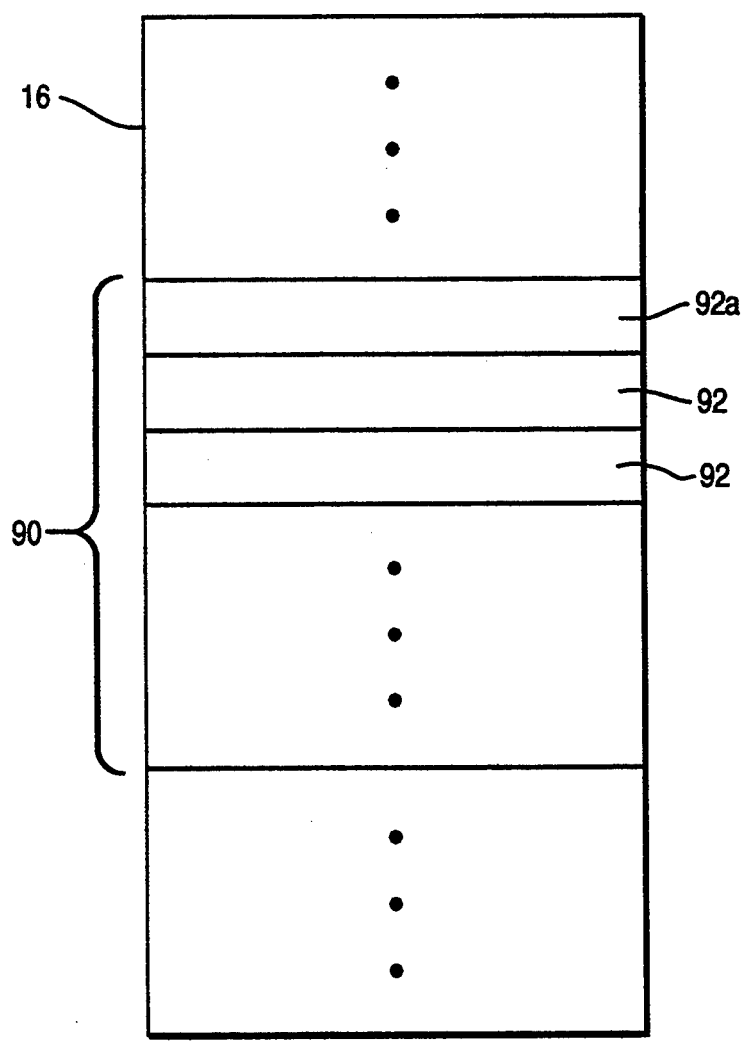
FIG_7

APPARATUS FOR EXECUTING A PLURALITY OF PROGRAM SEGMENTS HAVING DIFFERENT OBJECT CODE TYPES IN A SINGLE PROGRAM OR PROCESSOR ENVIRONMENT

FIELD OF THE INVENTION

This invention relates generally to computer systems, and more specifically to a computer system which allows code written in incompatible object codes to be mixed in a single program for execution.

BACKGROUND OF THE INVENTION

When a new computer processor is developed, existing applications or programs, herein "applications", which executed properly on a prior computer processor may not execute properly on the new computer processor. These old, or in other words, non-native applications are typically "ported", i.e. rewritten or translated, to run on the new processor. Usually, until an application is ported, it is unable to take advantage of any beneficial features in the new processor. Depending on the amount of effort required to port the application, there may be a substantial amount of time lost before an application can benefit from the new processor.

Typically a computer system having the new computer processor will have a separate environment for running "old" applications written for the old processor. This environment is called a "compatibility box". In these systems there is substantially no interaction between the compatibility box and the new processor environment, otherwise known as the "native" environment. Thus, "old" applications can not take advantage of performance benefits and other advantageous features available in the native environment.

Some computer systems have emulators which permit the computer system to execute code which is written for a processor other than the processor which is native to the computer system. Typically, these emulators assume a single runtime environment, that is to say that they assume that the conventions for invoking program procedures and performing stack manipulations are common to both the native and non-native or emulated code. These emulators typically just alter the instructions set and are not structured to handle two different types of program object code which have different routine calling and stack manipulation conventions. For example, these emulators are ill-equipped to handle CISC ("Complex Instruction Set Computer") such as Motorola 68000 (herein "68K") and RISC ("Reduced Instruction Set Computer") code (such as the IBM PowerPC or the IBM RISC System/6000) herein "RISC" simultaneously on the same machine. PowerPC, IBM and RISC System/6000 are registered trademarks of International Business Machines Corporation, Armonk, N.Y.

Background information on CISC machines can be found in "Inside Macintosh", Vols. I–VI, published by Addison-Wesley Publishing Co., 1985–1991, the disclosure of which is hereby incorporated by reference. Background information on IBM's RISC System/6000 machine can be found in "Machine organization of the IBM RISC System/6000 processor" by Gregory F. Grohoski and "IBM RISC System/6000 processor architecture" by R. R. Oehler and R. D. Groves, both articles published in IBM Journal of Research and Development, Vol. 34, No. 1, January 1990, at pp. 37–58 and pp. 23–36, respectively, the disclosures of which are hereby incorporated by reference.

Background information on IBM's RISC subroutine linkage conventions may be found in "AIX XL FORTRAN Compiler/6000 User's Guide Version 2.3", Chapter 10, September 1992, International Business Machines Corporation, Armonk, N.Y. and in "Managing programs and libraries in AIX Version 3 for RISC System/6000 processors", by Marc A. Auslander, published in IBM Journal of Research of Development, Vol. 34, No. 1, January 1990, pp. 98–104, the disclosures of which are hereby incorporated by reference. AIX is a trademark of International Business Machines Corporation.

In a 68K environment, a procedure pointer addresses the 68K routine itself, but in some other environments such as RISC, a procedure pointer addresses a structure such as a data structure or executable code which contains among other information an address of the routine. In the RISC System/6000 environment, the structure contains an address of an entry point to the routine, an address of a table of contents for a module in which that routine is bound and a pointer to an environment for languages that require such a pointer. If the RISC code were conformed to match the 68K runtime model, no advantages of the RISC instruction set could be used.

In some prior computer systems, to execute on a single processor two or more programming languages having different calling conventions the programming languages are altered to each use a common baseline calling convention. In other prior systems, a programming language is structured to explicitly handle the different calling conventions of the other languages.

Typically, computer systems which emulate prior processors in addition to supporting a new native processor only support one environment at a time. In other words, applications running simultaneously are executed in the same processor environment or mode. For example, when multiple applications are being executed at the same time, even if only one of the applications is written for a non-native processing environment and all of the other applications are designed for the native environment, ALL of the applications will be executed in an emulated environment appropriate for that one non-native application. Thus, none of those applications benefit from the advantages provided by the new, native processor.

SUMMARY OF THE INVENTION

It is a principal object of this invention to provide a transparent mechanism for switching between a plurality of processor modes such that an application or program can access any processor mode.

Another object of this invention is to provide a mechanism for an application to explicitly access a particular processor mode.

Another object of this invention is to provide a mechanism for identifying the appropriate processor mode on which to execute a particular program segment.

Another object of this invention is to support multiple applications in multiple environments at substantially the same time.

Another object of this invention is to permit a computer system to execute system software which is based in part on a plurality of processors.

Another object of this invention is to allow an executing program to change from a first processor mode to a second processor mode without changing the program's code.

This invention provides a method and apparatus for switching between execution of a plurality of object code types having different conventions for invoking program procedures and performing stack manipulations. The invention may also be used to switch between two or more different calling conventions within a single object code type. Briefly according to the invention, a computer system comprises a means for executing instructions for one or more code types, a routine descriptor, a stack switch frame, and a mode switching mechanism for switching between processor types or code types, herein referred to as "modes". The invention may also include other mechanisms for creating, manipulating and setting information within a routine descriptor and for accessing information associated with a particular routine descriptor.

The means for executing instructions may be for example a central processing unit and an emulator, a plurality of central processing units, or a single central processing unit having a plurality of modes of operation. The means for executing instructions further includes any related software used to execute the instructions.

A routine descriptor describes the characteristics of a program segment or portion of code such as its processor or code type and calling convention. Optionally, a routine descriptor can describe a plurality of program segments performing substantially the same function, but implemented in a variety of processor or code types and calling conventions. For descriptive purposes the term "processor environment" is used to denote a processor and/or program environment.

A routine descriptor contains, among other information, a "mixed mode" field which is set to a specific, predetermined value such as an illegal instruction or an illegal memory address. The value of the mixed mode field may vary depending upon the means for executing instructions and the type of switching operation being performed. Additionally, a routine descriptor may contain a "procedure information field" indicating a convention for invoking a program segment and performing appropriate stack manipulations.

The mixed mode field may be set to a value indicating an instruction which is not implemented or, in other words, illegal in at least one of the modes. For example, when the means for executing instructions is a single central processing unit and an emulator, the mixed mode field may be set to an instruction implemented only by that emulator and not by any other runtime environment or mode. When the emulator encounters this instruction, control is transferred to the mode switching mechanism.

Similarly, when the means for executing instructions is a plurality of central processing units, the mixed mode field may be set to an instruction which is not implemented by at least one of the central processing units.

However, there are situations in which the mixed mode field may be set to a legal instruction. For example, when using the invention to switch between two or more calling conventions of a single code type, the "mixed mode" field can be set to a legal instruction of that code type such as, for example, a branch or a trap instruction, such that the execution of that instruction would invoke a program segment capable of performing the mode switching operation.

When a routine calls a routine having a different stack model, the mode switching mechanism uses a stack switch frame to provide a transition between the two different stack types. An appropriate stack switch frame is allocated on the stack between the caller's stack frame and the callee's stack frame.

In a computer system embodying the invention, an application containing program segments having different object code types or being designed for different processors can execute on a single processor such that each program segment is executed in a mode appropriate for its code and processor type. Thus, native code benefits from advantageous features of the native processor, while at the same time, non-native code performs substantially as usual and can implicitly benefit from the native code without modification or knowledge of the native code's existence.

Another advantage of the invention is that although native applications may be aware that a program segment or code segment may be any of a plurality of code types, it can access features of an existing non-native application system software or program segment without knowing the exact code type of that non-native application system software or program segment. Moreover, non-native applications or system software do not have to be modified for a native application to access it.

The invention also permits code of a first code type to execute code of a second type or code of the first type without prior knowledge of the actual code type being executed. That is to say, that code of substantially any code type can execute substantially any other code without knowing the code type of that code.

BRIEF DESCRIPTION OF THE DRAWINGS

The above and further advantages of the invention may be better understood by referring to the following description in conjunction with the accompanying drawings, in which:

FIG. 1 shows a computer system having elements suitable for executing mixed modes in accordance with this invention;

FIG. 2 shows a routine descriptor;

FIGS. 3A-3F show the contents of a procedure information field;

FIG. 4 shows the contents of a register parameter field;

FIGS. 5A-5C show various configurations of a stack switch frame;

FIGS. 6A1-6A2 and 6B1-6B2 show the steps involved in switching from a 68K mode to a RISC mode and from a RISC mode to a 68K mode, respectively; and FIG. 7 shows a preferable embodiment for handling a routine having multiple calling conventions.

DETAILED DESCRIPTION OF ILLUSTRATIVE EMBODIMENT

Referring to FIG. 1 of the drawings, reference numeral 10 designates generally a computer having at least one central processing unit ("CPU") 12, a stack 14 and a memory 16. Stack 14 may be located within memory 16. Optionally, the computer 10 may have one or more registers 17. Memory 16 contains a plurality of code segments or portions of code 18. For illustration, memory 16 is shown to contain a first code segment 18a, a second code segment 18b and a third code segment 18c. Memory 16 also contains a routine descriptor 20 and, preferably, an emulator 21, except if computer 10 has a plurality of central processing units 12 or if computer 10 has a single central processing unit 12 having multiple modes.

ROUTINE DESCRIPTOR

As shown in FIG. 2, the routine descriptor 20 preferably includes a mixed mode field 28 and a selector field 29. Also, the routine descriptor includes a procedure information field 30 and a list 27 having one or more pairs 31, each pair 31 having a code type field 32 and a procedure pointer 33. Moreover, routine descriptor 20 may also include an indicator field 34, a version field 35 and a custom parameter procedure field 36. FIG. 2 merely illustrates an implementation of the routine descriptor; the exact arrangement of the fields within the routine descriptor may vary.

The mixed mode field 28, sometimes referred to as a first field, differentiates between processor modes. When an application is a native application or is a non-native application executing native code, the mixed mode field 28 is set to a mixed mode value indicating an instruction that will be implemented only by an emulator or an instruction that is illegal in at least one processor mode. For example, this value could be an unused instruction, an unused A-Trap or an unused F-line instruction, in other words, any value which is not a legal instruction in the non-native mode.

Optionally, the mixed mode field 28 may be set to a value such that a native application can be unaware that a program or code segment may be any of a plurality of code types. The first half of the mixed mode field may be set to an unobtrusive RISC instruction and the second half the mixed mode field could be a RISC illegal instruction or branch. The instruction is used to invoke the mode switching mechanism and other mechanisms such as those for creating and manipulating routine descriptors.

The selector field 29, sometimes referred to as a third field, contains a value indicating the type of mode switching operation to be performed. The selector field 29 can define services or functions particular to a specific embodiment of the invention.

Preferably, the selector field 29 may contain values indicating a load and execute, execute, or return operation. The load and execute operation permits a program segment of a native code type to be loaded by the code of the non-native code type in a way which is consistent for that non-native code type. Then, when the selector field specifies a load and execute operation, the mode switching mechanism performs operations specific to a native application's code type such as relocation, runtime binding and initialization.

The procedure information field 30, sometimes referred to as a fourth field, provides information about the calling conventions and parameters used by the routine referenced by the routine descriptor and as further described below.

The list 27 allows a routine descriptor to describe a plurality of program segments performing substantially the same function, but implemented in a variety of processor or code types and calling conventions. In some cases, it may be desirable to have program or code segments which perform the same function written in two or more code types so that the program or code segment which is best suited for the current runtime or processor environment can be chosen. Factors such as execution speed or available features or processors, as well as others, may be considered when determining which program or code segment type to execute.

When the list 27 contains more than one pair 31 and a routine descriptor is invoked, a preferred code type is selected from the code type fields 32 in the pairs 31. This preferred code type may be the code type that will best utilize the advantages of the particular computer system 10. Thus, a routine descriptor and its accompanying program segments can be invoked unmodified on a plurality of computer systems embodying the invention in various ways. For example, a dual 68K/RISC routine descriptor, that is a routine descriptor 20 wherein list 27 includes a pair 31 with a code type field indicating 68K and another pair 31 with a code type field indicating RISC, can be executed both on a computer which is only 68K and on a RISC computer having a 68K emulator. On the 68K-only computer, the 68K code type is selected, while on the RISC computer, the RISC code type is selected for its better performance and other beneficial features. The selection criteria may vary, but preferably the selection is based on performance and availability of various code types.

The code type field 32, sometimes referred to as a first segment, indicates the code or processor type in which the routine is written.

The procedure pointer 33, sometimes referred to as a second segment, points to the routine described by the routine descriptor 20 in a manner appropriate to the routine's natural code type.

The routine descriptor indicator field 34, sometimes referred to as a fifth field, identifies that portion of memory 16 as a routine descriptor.

The version field 35, sometimes referred to as a sixth field, indicates the version of the routine descriptor. This is useful if the structure of the routine descriptor changes in later revisions.

The custom parameter procedure field 36, sometimes referred to as seventh field, is used to point to a procedure that is provided when a routine descriptor is created. That procedure knows how to perform a transition between a code type of the caller routine and a code type of the callee routine. The custom parameter procedure field 36 is typically used to handle special cases which can not be easily defined by the procedure information field. However, a routine descriptor 20 may not include a custom parameter procedure field 36 and the procedure information field 30 may be used to handle the special cases and indirectly identify a procedure for transitioning between two object code types.

The actual contents of the procedure information field 30 depends upon the calling convention used by the routine being called. In each case, field 30 (FIG. 3A) contains a calling convention field 40 indicating the calling convention used by the routine, i.e. Pascal and C stack-based routines, register-based routines, stack-based dispatched routines and register-based dispatched routines. A calling convention is, among other things, a mechanism used to invoke a software routine. The "IBM Dictionary of Computing", (Ninth edition, 1991), defines calling conventions as "[s]pecified ways for routines and subroutines to exchange data with each other". The term "invoking mechanism" can be used interchangeably with the term calling convention, or in some instances, it may consist of a calling convention plus additional knowledge on the actual number and formats of the parameters. The difference is that a calling convention describes only the general mechanism, which can be applied to any combination of parameters, but the invoking mechanism may also include knowledge of about the parameters, specifically number and size.

For example, as shown in FIG. 3B, for Pascal and C stack-based routines the procedure information field 30 also contains a result size field 42 indicating the number of bytes returned by the routine and a parameter size field 43 describing the size of each parameter. The parameter size field 43 may be a list of parameter size values terminated by a zero value. FIG. 3C shows that for register-based routines the procedure information field 30 contains a register parameter field 44 which lists the registers in the same order as the parameters in the native interface. The register parameter field 44 may contain one or more input and output parameters. For example, parameter field 44 may contain two output parameters followed by four input parameters.

FIG. 3D shows for stack-based dispatch routines, that is routines which are accessed via a single entry point to a routine dispatcher (not shown), the procedure information field 30 contains a result size field 46 indicating the number of bytes returned by the routine, a selector size field 47 indicating the size of the selector, and a parameter size field 48 describing the size of each parameter and having the same format as field 43.

As shown in FIG. 3E, for register-based dispatch routines, i.e. routines where the parameters are passed in registers and the selector is passed on the stack, the procedure information field 30 also includes a selector size field 50 indicating the size of the selector on the stack and a register parameter field 51 describing the parameters in the same format as register parameter field 44 (FIG. 3C).

FIG. 3F shows a procedure information field 30 for handling situations other than those described above. Procedure information field 30 contains a calling convention field 40 and a user definable field 52. The user definable field 52 can be configured in a manner appropriate for the routine being described by the routine descriptor 20.

As shown in FIG. 4, for each parameter, field 44 may contain a register sub-field 53 and a parameter size sub-field 54.

Program or code segments having an "old" or non-native code type may execute whether or not there is a routine descriptor associated with them. However, a program or code segment having a "new" or "native" code type, typically has a routine descriptor associated with it.

A routine descriptor is especially useful when a program segment may be any of a plurality of code types. When it is known that program segments will be a particular code type and not any other code type, then a subroutine or library call can be used to access the mode switching mechanism directly without using the mixed mode field 28.

APPLICATION INTERFACE

Routine descriptors can be created statically when a program is compiled into object code and then resolved by a run-time linker which links object code segments together to form an executable program. At other times, however, it may be desirable to dynamically allocate and release routine descriptors, access information in a routine descriptor and set or change information in a routine descriptor.

Preferably, therefore, an interface provides means for an application to create and release routine descriptors.

For example, a command to create a routine descriptor preferably accepts the following parameters: a pointer to a routine, identification of the type of the procedure, procedure information and, optionally, a custom parameter procedure pointer, a mode indicator indicating a current mode, or optionally, an appropriate processor mode if it is different from the current mode, and returns a routine descriptor or pointer thereto. An implementation of this command in C programming language may look as follows: Routine Descriptor= New Routine Descriptor (ProcPtr theProc, ProcInfoType procInfo, CodeType executionMode).

Similarly, a command to release a routine descriptor and free any storage allocated thereto accepts a routine descriptor or a pointer thereto. For example, this command may be implemented as the following: DisposeRoutineDescriptor (RoutineDescriptor *theRoutine).

The interface may also allow an application to access information about a routine descriptor. For example, there may be commands to find out for a particular routine the type of code in which it is written, the procedure information associated with it, or the custom parameter procedure associated with it. For example, GetCodeType (RoutineDescriptor *theRoutine) may be used to access the type of code in which the routine being described is written.

Additionally, the interface may allow an application to change information in a routine descriptor. For example, commands may allow a procedure pointer to be changed or a procedure information field to be set. A command such as OSErr=SetProcInfo (RoutineDescriptor *theRoutine, ProcInfo Type procInfo) changes a routine descriptor's procedure information field to the given procInfo.

A program or code segment of an "old" or non-native code type such as 68K may call a native program or code segment through a routine descriptor without knowing that it is calling such native code. In that case for 68K, a routine descriptor is called directly as if it were a 68K procedure pointer and the parameters passed to the command are passed to the routine. If the routine is 68K, then the routine descriptor is really a 68K procedure pointer and the procedure to which it points is invoked. If the routine is native, or if it is a 68K routine of a different calling convention than expected by the caller routine, then the routine descriptor is a native or 68K routine descriptor starting with a mixed mode field 28 having a mixed mode value which triggers the mode switching mechanism.

Essentially, since the mixed mode field contains and is treated as being code of a non-native code type, references to a routine descriptor 20 and direct references to code or program segments having a non-native code type such as 68K are interchangeable. In the non-native code type environment, a routine descriptor is treated as a code or program segment which is executed, while in the new or native code type environment a routine descriptor is treated as data that is used by a means for accessing that data. Thus, a reference to non-native code can be replaced with a means for accessing a routine descriptor.

Preferably, the application interface permits an application or program segment to call a routine descriptor. This command calls the routine as described by a given routine descriptor and passes back any results. The purpose of this command is to allow an application or program segment to invoke routines of any code type.

For example, this mechanism permits native code to access the mode switching mechanism.

In a first embodiment of the invention, the command to call a routine descriptor accepts a routine descriptor, procedure information, and a list of parameters. For example, CallRoutineDescriptor (RoutineDescriptor *theRoutine, ProcInfoType procInfo, short numParams, . . . ) may be used to call a routine described by a given routine descriptor.

However, in some RISC environments, there may be substantial parameter shifting when the call to the routine is made. During execution of a CallRoutineDescriptor command, each parameter to that command is placed in a separate register and the procedure information parameter is used to transform parameters for the routine being described by the routine descriptor. Each parameter for the routine being described by the routine descriptor is then placed in a separate register, too. However, the register into which a parameter for the routine described by the routine descriptor is placed when calling CallRoutineDescriptor may be different than the register in which that routine expects to find its parameters. Thus, to execute that routine, those parameters must be moved into the appropriate registers. This parameter shifting is time-consuming and, particularly unnecessary and undesirable if no mode switch is to actually occur.

Therefore, in a preferable embodiment the information describing the parameters is encapsulated before the routine is called. For example, a command to accomplish this may look like: P=SetUpMixedMode(RoutineDescriptor *theRoutine, ProcInfoType procInfo, &parameter$_{13}$block ). When the program or code segment initiating the SetUpMixedMode command and the program or code segment identified by the routine descriptor are the same code type, the SetUpMixedMode command returns a valid pointer to the program or code segment identified by the routine descriptor. The program or code segment which issued the SetUpMixedMode command then directly calls the routine identified by the routine descriptor, e.g. (*P)(parameter1, parameter2, . . . ), thereby reducing the amount of parameter shifting and increasing the performance speed.

When the program or code segment initiating the SetUpMixedMode command has a native code type and the program or code segment identified by the routine descriptor has a non-native code type, the SetUpMixedMode command returns a pointer to a routine such that when invoked this routine can find a pointer to the parameter block identified by the &parameter$_{13}$block parameter. Basically, a parameter block is a block of available memory. The routine descriptor and procedure information passed as parameters to the SetUpMixedMode command are stored in the parameter block. The program or code segment initiating the SetUpMixedMode command then executes the routine.

STACK SWITCH FRAME

FIG. 5A shows a stack switch frame 60a which provides a transition between two different program segments having different stack models and calling conventions. The stack switch frame permits two different types of stack frames to coexist on a single stack model with a single stack pointer 58 by providing a transition area between the two different stack conventions.

When a program segment (caller) invokes another program segment (callee) and the callee uses a different stack model or calling convention than the caller, a stack switch frame 60a is positioned on stack 14 between the caller's stack frame 61 and the callee's stack frame 62. The caller's stack frame 61 is in a stack format appropriate for its code or process type, while the callee's stack frame 62 is in a stack format appropriate for its own code or process type.

The stack switch frame 60a contains a first segment 63 with information referencing the caller's stack frame 61 so that control can be returned to the caller once the callee's code or program segments has finished executing, a second segment 64 with parameters converted from the caller's format to the callee's format and a third segment 65 with any other content appropriate to configure the stack switch frame 60a in a format that is expected, or in other words can be handled, by the callee.

FIG. 5B shows a stack switch frame 60b for use when a 68K routine calls a native RISC routine. The arrow on the side of the stack indicates the direction in which the stack grows as stack frames are added to it. The stack switch frame 60b preferably includes 68K input parameters 66 (derived from the 68K parameters), a pointer 67 to a table of contents for global variables and a pointer 68 which refers back to the previous stack frame. The low bit in the pointer 68 is set to 1 to indicate that it is a stack switch frame. The stack switch frame 60b may also include a save register area 69 so that the callee routine can preserve the value of non-volatile registers.

FIG. 5C shows a stack switch frame 60c for use when a RISC routine calls a 68K routine. The stack switch frame 60c includes an indicator 70, a RISC register save area 72, saved procedure information 74, a routine descriptor area 76, 68K register save area 78, a 68K result space 74, 68K parameters 76 and a return address 78. The indicator 70 is set to a value that is a non-valid value for a frame pointer, i.e. 0, −1, or an odd value. The RISC register save area 72 is used to save the RISC non-volatile registers on the stack every time a mode switch is done. The routine descriptor area 76 preferably contains a mixed mode field 28 and a selector field 29 (FIG. 2). The 68K result space 80 and the 68K parameters 82 are pushed on the stack 14 as necessary, depending on the calling convention of the 68K callee. The parameters 82 are derived and converted from the RISC input parameters. The return address 84 contains the address of the routine to be called when the 68K code finishes executing.

MODE SWITCHING MECHANISM

In use, when a routine calls another routine having a different stack model, the caller pushes its stack frame on the stack 14. Then the mode switching mechanism pushes a stack switch frame on the stack 14. The stack pointer 58 is then set to point to the bottom of the stack switch frame. If it is a stack switch frame 60c, the 68K stack pointer is set to point to the bottom of the stack switch frame as well.

A stack switch frame 60b is released from the stack 14 by setting the stack pointer 58 to the value of pointer 68 and storing the return address stored in the location in the caller's stack referenced by pointer 68 in a register 17. A stack switch frame 60c is released by restoring the saved non-volatile registers and resetting the stack pointer accordingly.

The stack 14 can be traversed frame by frame even if there is a stack switch frame 60b or 60c in the stack. For a stack switch frame 60b, if the low-bit in the pointer 68 is set to 1 then it is a stack switch frame and the rest of the bits in the pointer 68 point to the caller's stack frame pointer. For a stack switch frame 60c, if the indicator 70 is equal to a non-valid value for a frame pointer, then it is a switch frame.

In use, when code is executing and a routine or function call is executed, the pointer associated with that call points to either 68K code or to a routine descriptor. The code type field in the routine descriptor is used to determine whether a mode switch should occur. FIGS. 6A1–6A2 and 6B1–6B2 show a mode switching mechanism for switching between 68K and PowerPC RISC modes. As described in FIG. 6A1–6A2, if the mixed mode field 28 equals the mixed mode value or if a mode switch is otherwise indicated, then the routine descriptor is checked to make sure that it is a valid routine descriptor. If it is valid, then the select field is checked to see which operation should be performed.

If it is an execute operation then the procedure information field is interpreted to determine if it is a register-based or stack-based routine. If it is a register-based routine, then the stack switch frame is built. If the RISC routine will modify registers or return results in them, then the parameters are moved out of the 68K registers into the reserved space on the stack switch frame. Then, in either case, the parameters are moved into RISC registers.

If it is a stack-based routine, then all of the parameters defined by the procedure information field are taken off the 68K stack and placed in RISC registers. The stack switch frame is then built.

Whether it is a stack- or register- based routine, the target address from the routine descriptor is then used to jump to the RISC code. After executing the code, check to see if register- or stack-based. If register-based then move output parameters from the stack switch frame back into 68K registers. However, if stack-based then copy a return value, if any exists in the procedure information field from the RISC register to the 68K stack. In either case, release the stack switch frame and jump back into 68K code.

If it is a load and execute operation, then any other loading operations beyond those already performed by the non-native code are performed. These loading operations may include, for example, relocation, runtime binding and initialization. Then the procedure information is interpreted and the same steps as described for the execute operation are performed.

If it is a return operation then the return result is pulled off of the 68K stack and put into a native RISC return register. The nonvolatile registers that were saved are restored and the stack switch frame is released. Control then returns back to the calling code.

FIG. 6B1–6B2 shows a mechanism for switching between RISC code and 68K code. A routine descriptor is called using either of the alternative embodiments described above. The stack switch frame is then allocated and all RISC nonvolatile registers are saved in the stack switch frame to be restored later.

It is then determined whether it is register-based or stack-based. If it is register-based then input parameters are pulled out of native registers and put into 68K registers.

The 68K stack frame is then built. If the 68K routine will return a value, then space is allocated in the stack frame for it. Parameters that were passed in from the RISC code are put in the 68K stack frame. The return address is set to a value pointing to a special routine descriptor having a selector field equal to a return value.

The routine address is taken from the routine descriptor and the emulator is invoked. The emulator executes the code and when it is finished it tries to execute a return address which was set to be the beginning of a special routine descriptor. When the emulator tries to execute it, control is transferred back to the mode switching mechanism. The mode switching mechanism checks the selector field which equals the return operation and performs the appropriate actions as described above.

MULTIPLE CALLING CONVENTIONS IN A SINGLE OBJECT CODE TYPE

The invention can also be used to switch between different calling conventions within an object code type. For example, the invention can be used to switch between FORTRAN and PASCAL. In this case, the mode switching mechanism is substantially identical except that no execution or code type mode switching occurs, but rather only the calling convention transformation is performed. Also, the stack switch frame may be simplified because switching occurs merely between calling conventions, not code types.

MULTIPLE CALLING CONVENTIONS IN A SINGLE ROUTINE

The invention may also be used in routines, that is code or program segments, which have multiple calling conventions. For example, a routine may be a function where a first parameter is a selector and the other parameters vary in number, size, content and type depending on the value of the selector. FIG. 7 shows a preferable embodiment wherein memory 16 contains a lookup table 90 having a plurality of fields 92. A routine descriptor 20 is associated with each valid selector value and that routine descriptor references a program or code segment corresponding to that selector value. A first field 92a in the lookup table 90 contains an instruction for branching to a program or code segment which looks up an appropriate field 92 in the lookup table corresponding to the routine. That field 92 in conjunction with the selector value is used to determine which routine descriptor to use and thereby which code or program segment to execute.

For example, a routine may have a first parameter which is a selector capable of having three different valid values, e.g. 1, 2, or 3, and depending on the value of the selector, there may be one, two or three parameters which follow, respectively. In other words, if the selector value is 1, then one parameter follows the selector, but if the selector value is 2, then two parameters follow the selector. For each selector value, a routine descriptor 20 is associated with a code or program segment to perform that routine for the appropriate number of parameters.

When the routine is looked up in table 90, the selector value is used to determine which routine descriptor to use and, thereby, which code or program segment to execute.

The foregoing description has used a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

We claim:

1. An apparatus for executing a plurality of modes in a processor environment in a computer system having a processor and a memory, said apparatus comprising:

a mixed mode field for differentiating between modes, said mixed mode field capable of specifying at least a first and second state, said mixed mode field being set to a specific, predetermined value when in said second state;

means for specifying a software routine;

a procedure information field for indicating a mechanism capable of initiating the execution of the specified software routine and for specifying one or more characteristics of parameters to be used by the executing specified software routine;

means for setting said mixed mode field to a specific, predetermined value, said setting means arranged for accessing said mixed mode field;

means for setting said procedure information field to indicate an initiating mechanism and parameter characteristics for the specified software routine;

means for determining the value of the mixed mode field, said determining means arranged for accessing the value of said mixed mode field;

means for switching from a first mode to a second mode, said switching means being coupled to said determining means and being activated in response to a determination that said mixed mode field has said specific, predetermined value;

means for using the execution initiating mechanism and the parameter characteristics specified by the procedure information field to invoke the specified software routine, thereby causing the specified software routine to execute, said using means being coupled to said switching means such that said using means is invoked when said switching means switches from a first mode to a second mode; and means for returning to the first mode, said returning means being activated upon completion of the execution of the specified software routine.

2. An apparatus defined in claim 1 further comprising:

a stack arranged within the apparatus so that it can be accessed by the processor, said stack having a first stack frame associated with a first specified software routine and a second stack frame associated with a second specified software routine, said first and second stack frames having different formats; and a stack switch frame, positioned in the stack between said first and said second stack frames, said stack switch frame having a first segment referencing the first stack frame, a second segment having parameters in a format of the second stack frame, said parameters having been converted from a format of the first stack frame, and a third segment specifying information so that the stack switch frame is in a format that can be referenced by the second stack frame, said first segment being placed in the stack upon execution of said first specified software routine, and said second and third segments being placed in the stack after said switching means switches from a first mode to a second mode.

3. An apparatus defined in claim 2 wherein said transitioning means includes a stack switch frame placed on said stack between said first and second stack frames.

4. An apparatus defined in claim 3 wherein said stack switch frame includes a pointer to the previous stack frame on said stack and said pointer has a low bit set to 1.

5. An apparatus defined in claim 4 wherein said stack switch frame further includes a list of input parameters.

6. An apparatus defined in claim 5 wherein said stack switch frame further includes a save register area for preserving the value of registers.

7. An apparatus defined in claim 3 wherein said stack switch frame includes a first segment containing information referencing said first stack frame, a second segment containing parameters converted from a format of said first mode to a format of said second mode, and a third segment for configuring said stack switch frame in a format that is expected by a routine in the second mode.

8. An apparatus defined in claim 2 wherein said stack switch frame further includes an indicator which is set to a non-valid frame pointer value.

9. An apparatus defined in claim 1 wherein said specific, predetermined value is an illegal instruction.

10. An apparatus for executing a plurality of modes in a processor environment, the plurality of modes including at least a first and a second mode, said apparatus comprising:

a routine descriptor for describing a code segment;

a mixed mode field disposed within said routine descriptor for differentiating between modes;

means for setting said mixed mode field to a specific, predetermined value;

means for specifying a plurality of operations;

a selector field disposed within said routine descriptor for indicating one operation from within the specified plurality of operations;

means for setting said selector field to specify one operation of the plurality of operations;

means for executing a plurality of instructions;

means for determining during the execution of each instruction of the plurality of instructions whether a routine descriptor having a mixed mode field which is set to the specific, predetermined value is encountered, said determining means being coupled to said executing means;

means for switching from a first mode to a second mode, said switching means coupled to said determining means such that said switching means is activated when said determining means determines that the mixed mode field is set to the specific, predetermined value;

means for performing the operation specified in the selector field of the routine descriptor referenced by the instruction being executed, said performing means being coupled to said switching means such that said performing means is activated after said switching means switches from the first to the second mode; and means for returning to the first mode, said returning means being activated upon completion of the execution of the specified operation.

11. An apparatus for executing a plurality of modes in a processor environment, the plurality of modes including at least a first and a second mode, said apparatus comprising:

a routine descriptor for describing a code segment, the code segment being written in a programming language having a protocol for passing parameters and results to and from the code segment;

a mixed mode field disposed within said routine descriptor for differentiating between modes;

means for setting said mixed mode field to a specific, predetermined value;

a procedure pointer disposed within said routine descriptor, said procedure pointer specifying the code segment described by the routine descriptor;

a procedure information field disposed within said routine descriptor for indicating a protocol for passing parameters and results for the code segment specified by the procedure pointer;

means for setting said procedure information field to specify the protocol for passing parameters and results for the code segment specified by the procedure pointer;

means for executing a plurality of instructions;

means for determining during the execution of each instruction of the plurality of instructions whether a routine descriptor having a mixed mode field which is set to the specific, predetermined value is encountered, said determining means being coupled to said executing means;

means for switching from a first mode to a second mode, said switching means being coupled to said determining means such that said switching means is activated when said mixed mode field has said specific, predetermined value;

means for executing the code segment specified by the procedure pointer said executing means being activated after the switching means switches from a first mode to a second mode, said executing means using the protocol specified in said procedure information field to pass parameters to the code segment; and means for returning to the first mode, said returning means being activated upon completion of the execution of the code segment.

12. An apparatus defined in claim 11 further comprising:

a stack arranged within the apparatus so that it can be accessed by the processor, said stack having a first stack frame associated with a first specified code segment and a second stack frame associated with a second specified code segment, said first and second stack frames having different formats; and a stack switch frame, positioned in the stack between said first and said second stack frames, said stack switch frame having a first segment referencing the first stack frame, a second segment having parameters in a format of the second stack frame, said parameters having been converted from a format of the first stack frame, and a third segment specifying information so that the stack switch frame is in a format that can be referenced by the second stack frame, said first segment being placed in the stack upon execution of said first specified code segment and said second and third segments being placed in the stack after said switching means switches from a first mode to a second mode.

13. An apparatus defined in claim 12 wherein said transitioning means includes a stack switch frame placed on said stack between said first and second stack frames.

14. An apparatus defined in claim 13 wherein said stack switch frame includes a pointer to the previous stack frame on said stack.

15. An apparatus defined in claim 14 wherein said stack switch frame includes means for indicating it is a stack switch frame.

16. An apparatus defined in claim 15 wherein said indicating means is a low bit in said pointer that is set to 1.

17. An apparatus defined in claim 14 wherein said stack switch frame further includes a list of input parameters.

18. An apparatus defined in claim 14 wherein said stack switch frame further includes a save register area for preserving the value of a register.

19. An apparatus defined in claim 14 wherein said stack switch frame includes an indicator which is set to a non-valid frame pointer value.

20. An apparatus defined in claim 14 wherein said stack switch frame further includes a save register area for preserving the value of a register, a result area, a parameter area and a return address.

21. An apparatus defined in claim 11 wherein said specific, predetermined value is an illegal instruction.

22. An apparatus defined in claim 11, said routine descriptor further including
a second field for addressing the code segment described by the routine descriptor,
a third field for indicating the type of mode switching operation to be performed after the switching means to a new mode, and
a list of one or more pairs, each pair having a first segment for indicating the code type of the code segment being described by the routine descriptor and a second segment for indicating which routine is described by said routine descriptor.

23. An apparatus defined in claim 11, said routine descriptor further including:
a parameter field containing a pointer to a routine for converting a parameter from a first mode to a second mode;
a procedure pointer addressing a code segment described by the routine descriptor;
a selector field for indicating which operation should be performed after the switching means switches to a new mode; and
a code type field indicating a code type of the code segment being described by the routine descriptor.

24. An apparatus for executing a plurality of program segments having different object code types in a processor environment, said apparatus comprising:
a processor;
a memory;
a stack accessible by said processor, said stack having a first stack frame and a second stack frame, said first stack frame being associated with a first code segment having a first object code type and said second stack frame being associated with a second code segment having a second object code type wherein said first and second object code types are incompatible thereby causing said first and second stack frames to have different formats, said first code type being associated with a first invoking mechanism and said second code type being associated with a second invoking mechanism wherein said first and second invoking mechanisms are incompatible;
a stack switch frame, positioned in said stack between said first and said second stack frames, said stack switch frame having a first segment referencing the first stack frame, a second segment having parameters in a format of the second stack frame, said parameters having been converted from a format of the first stack frame, and a third segment information so that the stack switch frame is in a format that can be referenced by the second stack frame;

means for indicating a switch from a first mode to a second mode, wherein said executing means executes said first code segment in said first mode and said second code segment in said second mode, said indicating means being initiated when said first code segment invokes said second code segment using said first invoking mechanism;

means for switching from a first mode to a second mode, said switching means being activated by said indicating means;

means for executing code segments having one of a plurality of object code types, said executing means allocating said first stack frame on said stack at execution of said first code segment and, upon said switching means switching from the first to the second mode, allocating said stack switch frame and said second stack on said stack and executing said second code segment using said second invoking mechanism; and means for returning to said first mode, said returning means being activated by the completion of the execution of said second code segment.

25. An apparatus defined in claim 24 further comprising means for deallocating the stack switch frame from said stack, said deallocating means being coupled to said returning means such that the stack switch frame is deallocated upon returning to said first mode from said second mode.

26. An apparatus for executing a plurality of mechanisms for invoking software routines having a same object code type but incompatible invoking mechanisms, said apparatus comprising:

a processor;

a memory capable of being accessed by said processor;

a stack accessible by said processor, said stack having a first stack frame and a second stack frame, said first stack frame being associated with a first code segment having a first object code type and said second stack frame being associated with a second code segment having a second object code type wherein said first and second object code types are incompatible thereby causing said first and second stack frame to have different formats, said first code type being associated with a first invoking mechanism and said second code type being associated with a second invoking mechanism wherein said first and second invoking mechanisms are incompatible;

a stack switch frame, positioned in said stack between said first and said second stack frames, said stack switch frame having a first segment referencing the first stack frame, a second segment having parameters in a format of the second stack frame, said parameters having been converted from a format of the first stack frame, and a third segment specifying information so that the stack switch frame is in a format that can be referenced by the second stack frame;

means for specifying a first software routine and a second software routine, said first and second software routines having the same object code type, said first software routine capable of being invoked by a first invoking mechanism and said second software routine capable of being invoked by a second invoking mechanism, where said first invoking mechanism is incompatible with said second invoking mechanism;

means for using said second invoking mechanism to invoke said second software routine in response to an attempt by said first software routine to use said first invoking mechanism to invoke said second software routine, said using means allocating said stack switch frame and said second stack on said stack and executing said second software routine; and means for returning to said first mode, said returning means being activated by the completion of the execution of said second software routine.

27. An apparatus for executing a software routine having a plurality of invoking mechanisms, said software routine having one or more parameters, the first parameter being a selector and the other parameters varying in number, size, content and type depending on the value of the selector, said apparatus comprising:

a memory means for defining one or more selector values, each selector value associated with a specific configuration of the one or more parameters;

a plurality of routine descriptors, each selector value being coupled with a separate one of the plurality of routine descriptors, said routine descriptor referencing a code segment for implementing the software routine with the specific parameter configuration associated with the coupled selector value;

means for specifying a selector value:

a table located in said memory, said table having a plurality of fields, said plurality of fields including a first field referencing an instruction for branching to a program for looking up an a field in the table and a plurality of other fields, each of said other fields coupling a routine descriptor with each valid defined selector value means for looking up a selector value field in said table according to the specified selector value; and means for executing the code segment identified by the routine descriptor coupled to the specified selector value field.

28. An apparatus for executing a plurality of object code types within a processor environment having a processor and a memory, the plurality of object code types having at least a first object code type and a second object code type, said first and second object code types being incompatible, said apparatus comprising:

means for specifying a first software routine having said first object code type;

means for specifying a second software routine having said second object code type;

means for specifying a switch from said first object code type to said second object code type, said specifying means being transparent to said first software routine;

means for switching from said first object code type to said second object code type when said specifying means is encountered during execution of said first software routine, said switch occurring in a manner which is transparent to said first software routine;

means for executing said second software routine, said executing means being coupled to said switching means such that said executing means is activated upon a switch from said first object code type to said second object code type; and means for returning to said first object code type upon completion of the execution of said second software routine, said returning means resuming execution of said first software routine.

29. An apparatus for executing a plurality of modes in a processor environment in a computer system having at least a first mode and a second mode, said apparatus comprising:

a memory;

a routine descriptor for describing a software routine;

a mixed mode field disposed within said routine descriptor for differentiating between modes;

means for setting said mixed mode field to a specific, predetermined value;

a procedure pointer field disposed within said routine descriptor for indicating an address of a software routine;

a procedure information field disposed within said routine descriptor for indicating a mechanism capable of initiating the execution of the software routine having an address indicated in said procedure pointer field, said procedure information field further specifying one or more characteristics of parameters to be used by the executing software routine;

means for invoking a software routine in the second mode, said invoking means capable of accepting one or more parameters for the software routine addressed by the procedure information field of said routine descriptor;

a pointer to a buffer in the memory;

a processor, said processor capable of executing said invoking means;

means for encapsulating in the buffer the one or more parameters, said encapsulating means coupled to said invoking means such that the one or more parameters are encapsulated in the buffer prior to execution of the invoking means, whereby said processor passes the pointer to the buffer to said invoking means upon execution of said invoking means;

means for setting said procedure information field to a value indicating that parameters are to be encapsulated in a buffer;

means for executing a plurality of instructions;

means for determining during the execution of each instruction of the plurality of instructions whether a routine descriptor having a mixed mode field which is set to the specific, predetermined value is encountered, said determining means being coupled to said executing means;

means for switching from a first mode to a second mode, said switching means coupled to said determining means such that said switching means is activated when said determining means determines that the mixed mode field is set to the specific, predetermined value;

means for performing the operation specified in the selector field of the routine descriptor referenced by the instruction being executed, said performing means being coupled to said switching means such that said performing means is activated after said switching means switches from the first to the second mode; and means for returning to the first mode, said returning means being activated upon completion of the execution of the specified operation.

30. An apparatus for executing a single routine descriptor referencing a plurality of code segments having incompatible object code types in a processor environment in a computer system having a processor and a memory, said apparatus comprising:

a routine descriptor;

a mixed mode field in said routine descriptor for differentiating between modes, said mixed mode field capable of specifying at least a first and second state, said mixed mode field being set to a specific, predetermined value when in said second state;

means for specifying a plurality of software routines in said routine descriptor, each software routine having a different object code type;

means for indicating one of the plurality of software routines;

means for indicating a mechanism capable of initiating the execution of the indicated software routine and for specifying one or more characteristics of parameters to be used by the executing indicated software routine;

means for setting said mixed mode field to a specific, predetermined value, said setting means arranged for accessing said mixed mode field;

means for determining the value of the mixed mode field, said determining means arranged for accessing the value of said mixed mode field;

means for switching from a first mode to a second mode, said switching means being coupled to said determining means and being activated in response to a determination that said mixed mode field has said specific, predetermined value;

means for using the execution initiating mechanism and the parameter characteristics of the indicated software routine to invoke the indicated software routine, thereby causing the indicated software routine to execute, said using means being coupled to said switching means such that said using means is invoked when said switching means switches from a first mode to a second mode; and means for returning to the first mode, said returning means being activated upon completion of the execution of the specified software routine.

31. An apparatus defined in claim 30 wherein said means for specifying is a list of one or more pairs, said list being stored in said routine descriptor, each of said one or more pairs having a first segment for indicating an object code type of a software routine of the plurality of software routines, and a second segment for referencing the software routine.

32. An apparatus defined in claim 31 wherein said means for indicating one of the plurality of software routines indicates a criteria for use in selecting a software routine from the plurality of software routines, said apparatus further comprising means for selecting a software routine from the plurality of software routines based on the indicated criteria and using that selected software routine as the indicated software routine, said selecting means comprising means for determining which pair in said list has a first segment specifying a code type which best satisfies the indicated criteria.

33. An apparatus defined in claim 30 wherein said means for indicating one of the plurality of software routines indicates a criteria for use in selecting a software routine from the plurality of software routines, said apparatus further comprising means for selecting a software routine from the plurality of software routines based on the indicated criteria and using that selected software routine as the indicated software routine.

34. An apparatus defined in claim 33 wherein said criteria is execution speed, such that said selecting means chooses the software routine from the plurality of software routines which will execute fastest in the processor environment.

35. An apparatus for executing a plurality of software routines having different object code types in a processor environment, said apparatus comprising:
 a routine descriptor for describing a software routine;
 a mixed mode field disposed within said routine descriptor for differentiating between modes;
 means for setting said mixed mode field to a specific, predetermined value;
 a procedure pointer disposed within said routine descriptor, said procedure pointer specifying a software routine;
 means for indicating an object code type of the specified software routine, said indicating means being disposed within said routine descriptor;
 means for setting said indicating means to specify the object code type of the specified software routine; and
 means for executing said specified software routine when said specified software routine is called from one of the other of the plurality of software routines, said other software routine having an object code type which is incompatible with the object code type of said specified software routine.

36. An apparatus for executing a plurality of mechanisms for invoking software routines having a same object code type but incompatible invoking mechanisms, said apparatus comprising:
 a processor;
 a memory capable of being accessed by said processor;
 means for specifying a first software routine and a second software routine, said first and second software routines having the same object code type, said first software routine capable of being invoked by a first invoking mechanism and said second software routine capable of being invoked by a second invoking mechanism, where said first invoking mechanism is incompatible with said second invoking mechanism;
 means for using said second invoking mechanism to invoke said second software routine in response to an attempt by said first software routine to use said first invoking mechanism to invoke said second software routine, said using means executing said second software routine; and
 means for returning to said first mode, said returning means being activated by the completion of the execution of said second software routine.

37. A method for executing a plurality of modes in a processor environment in a computer system having at least one processor and a memory, each mode having an associated set of valid instructions which can be executed by the processor, said method comprising the steps of:
 allocating a routine descriptor in the memory;
 setting a pointer to the address of the routine descriptor;
 setting contents of a first field in the routine descriptor equal to an instruction which is invalid in a first mode, the first field being positioned so that the pointer to the routine descriptor points to the contents of the first field;
 setting contents of a procedure pointer field in the routine descriptor to an address of a software routine capable of being executed in a mode other than the first mode;
 executing in the first mode contents of said first field;
 switching mode upon execution of an instruction which is invalid in the first mode, the second mode being different than said first mode and being a mode in which the software routine can execute;
 after switching to the second mode, executing the routine addressed by the procedure pointer field; and
 upon completion of execution of the routine, returning to the first mode.

38. A method defined in claim 37 further comprising the steps of:
 setting contents of a selector field in the routine descriptor to a value indicating the type of mode switching operation to be performed after switching to the second mode; and
 after switching to the second mode, but before executing the software routine, performing the operation indicated by the contents of the selector field.

39. A method defined in claim 38 further comprising the steps of:
 setting contents of a code type field within the routine descriptor to a code type of the routine addressed by the procedure pointer field of that routine descriptor; and
 using the content of the code type field to switch to a second mode whereby the software routine can be executed in a mode corresponding to the code type specified by the code type field.

40. A method defined in claim 39 further comprising the steps of:
 when the selector field indicates an execute operation, determining if the routine described by the routine descriptor is register-based or stack-based;
 if the routine is register-based, allocating a stack switch frame, inserting information into the stack switch frame, pushing the stack switch frame onto a stack and moving parameters into registers
 moving parameters into registers, allocating a stack switch frame, inserting information into the stack switch frame and pushing the stack switch frame onto a stack;
 jumping to the address of the routine being described by the routine descriptor;
 executing the routine being described by the routine descriptor;
 after the routine finishes executing, if the routine is register-based, moving output parameters from the stack switch frame into registers and if the routine is stack-based, copying a return value from a register into a stack; and
 releasing the stack switch frame.

41. A method defined in claim 39 further comprising the steps of:
 when the selector field indicates a load and execute operation, performing load operations specific to a code type of the routine being described by the routine descriptor;
 if the routine is register-based, allocating a stack switch frame, inserting information into the stack switch frame, pushing the stack switch frame onto a stack and moving parameters into registers if the routine is stack-based, moving parameters into registers, allocating a stack switch frame, inserting information into the stack switch frame and pushing the stack switch frame onto a stack;

jumping to the address of the routine being described by the routine descriptor;

executing the routine being described by the routine descriptor;

after the routine finishes executing, if the routine is register-based, moving output parameters from the stack switch frame into registers and if the routine is stack-based, copying a return value from a register into a stack; and releasing the stack switch frame.

42. A method for executing a plurality of modes in a processor environment in a computer system having at least one central processing unit and a memory, said method comprising the steps of:

allocating memory space for a routine descriptor;

setting a pointer to the address of the first routine descriptor;

setting contents of a mixed mode field in the first routine descriptor equal to a nonvalid instruction;

executing contents of the field;

switching from a first mode to a second mode when executing contents of the mixed mode field which are equal to a nonvalid instruction;

setting contents of a selector field in the first routine descriptor to a type of mode switching operation to be performed after switching to the second mode;

after switching to the second mode, performing the operation indicated by the contents of the selector field;

allocating a second routine descriptor;

setting the selector field in the second routine descriptor to a value indicating a return to the first mode operation;

allocating a stack switch frame;

saving values of registers in the stack switch frame;

determining if the routine being described by the first routine descriptor is register-based or stack-based and if the routine is register-based, moving input parameters from first mode registers and putting them into second mode registers;

putting information into the stack switch frame;

if the routine returns a value, allocating space in the stack switch frame for it;

putting parameters into the stack switch frame;

setting a return address in the stack switch frame equal to the address of the second routine descriptor;

executing the routine described by the first routine descriptor;

checking the selector field of the second routine descriptor; and when the selector field of the second routine descriptor indicates a return operation, returning to the first mode.

43. A method for executing a plurality of mechanisms for invoking a software routine within a single routine, said method comprising the steps of:

creating a lookup table having a plurality of fields;

setting a first field in said plurality of fields to identify a mode switching mechanism;

writing a code or program segment to handle each valid selector value for a routine;

creating a routine descriptor for each of-the code or program segments;

setting a field in the lookup table for each of the routine descriptors;

looking up a particular field in the lookup table based on a selector value; and executing a routine described by a routine descriptor identified by that particular field.

44. A method for executing a plurality of modes in a processor environment in a computer system having a processor and a memory, each mode having an associated set of valid instructions which can be executed by the processor, said method comprising the steps of:

allocating a routine descriptor in the memory;

setting a pointer to the address of the routine descriptor;

setting contents of a first field in the routine descriptor equal to an instruction which is invalid in a first mode, the first field being positioned so that the pointer points to the contents of the first field;

setting contents of a procedure pointer field in the routine descriptor to an address of a software routine capable of being executed in a mode other than the first mode;

encapsulating in a buffer characteristics of parameters to be used by the software routine;

executing in the first mode contents of said first field;

switching to a second mode upon execution of an instruction which is invalid in the first mode, the second mode being different than said first mode and being a mode in which the software routine can execute;

after switching to the second mode, executing the software routine addressed by the procedure pointer field using the parameter characteristics encapsulated in the buffer; and upon completion of execution of the software routine, returning to the first mode.

* * * * *